(12) United States Patent
Obert et al.

(10) Patent No.: US 9,358,958 B2
(45) Date of Patent: Jun. 7, 2016

(54) WIPER BLADE ADAPTER DEVICE

(75) Inventors: Mike Obert, Gernsbach (DE); Andreas Benner, Taipei (TW); Eckhard Lichtenthaler, Karlsruhe-Hohenwettersbach (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 14/111,717

(22) PCT Filed: Mar. 9, 2012

(86) PCT No.: PCT/EP2012/054109
§ 371 (c)(1),
(2), (4) Date: Oct. 14, 2013

(87) PCT Pub. No.: WO2012/139825
PCT Pub. Date: Oct. 18, 2012

(65) Prior Publication Data
US 2014/0033466 A1 Feb. 6, 2014

(30) Foreign Application Priority Data
Apr. 13, 2011 (DE) .................. 10 2011 007 248

(51) Int. Cl.
*B60S 1/40* (2006.01)
*B60S 1/38* (2006.01)

(52) U.S. Cl.
CPC .............. *B60S 1/40* (2013.01); *B60S 1/3858* (2013.01); *B60S 1/381* (2013.01); *B60S 1/3849* (2013.01); *B60S 1/3889* (2013.01); *B60S 2001/4096* (2013.01)

(58) Field of Classification Search
CPC ........ B60S 1/40; B60S 1/3858; B60S 1/3851; B60S 1/3849; B60S 2001/409
USPC ............... 15/250.32, 250.33; 403/321, 322.4, 403/326, 323, 322.1, 329
See application file for complete search history.

(56) References Cited

U.S. PATENT DOCUMENTS

| 3,641,614 | A | * | 2/1972 | Newsome ................. | 15/250.32 |
| 4,069,539 | A | * | 1/1978 | Klingberg et al. ......... | 15/250.32 |
| 4,094,038 | A | * | 6/1978 | Hancu ....................... | 15/250.32 |
| 4,670,934 | A | * | 6/1987 | Epple et al. ................ | 15/250.32 |
| 6,301,741 | B1 | * | 10/2001 | Westermann et al. ..... | 15/250.32 |
| 6,978,511 | B2 | * | 12/2005 | Poton ........................ | 15/250.32 |
| 7,814,611 | B2 | * | 10/2010 | Heinrich et al. ........... | 15/250.32 |
| 9,045,113 | B2 | | 6/2015 | Aznag et al. | |

FOREIGN PATENT DOCUMENTS

| DE | 102009002783 | | 11/2010 |
| FR | 2311694 | | 12/1976 |
| FR | 2781742 | * | 2/2000 |
| GB | 713425 | | 8/1954 |
| JP | 2005-59630 | * | 3/2005 |

OTHER PUBLICATIONS

International Search Report for Application No. PCT/EP2012/054109 dated May 31, 2012 (2 pages).

* cited by examiner

*Primary Examiner* — Gary Graham
(74) *Attorney, Agent, or Firm* — Michael Best & Friedrich LLP

(57) ABSTRACT

The invention relates to a wiper blade adapter device having a wiper arm adapter (10) and a wiper blade adapter (12). The wiper blade adapter device comprises a pivot bearing unit (14) which is provided to rotatably mount the wiper arm adapter (10) and the wiper blade adapter (12) in an assembly process relative to each other around a vertical axis (16).

20 Claims, 2 Drawing Sheets

WIPER BLADE ADAPTER DEVICE

BACKGROUND OF THE INVENTION

Wiper blade adapter devices having a wiper arm adapter and a wiper blade adapter are already known from the prior art.

SUMMARY OF THE INVENTION

The invention relates to a wiper blade adapter device having a wiper arm adapter and a wiper blade adapter.

According to the invention, the wiper blade adapter device comprises a pivot bearing unit which is provided to rotatably mount the wiper arm adapter and the wiper blade adapter in an assembly process relative to each other around a vertical axis. A fast and intuitive assembly process can thereby be achieved for a user. "Wiper arm adapter" refers in this context particularly to an adapter which has a contact area with a wiper arm component and is provided to furnish a coupling area of the wiper arm component for coupling and/or contacting to a wiper blade adapter. The wiper arm component can preferably be attached to a wiper arm. A "wiper blade adapter" refers in this context particularly to an adapter which has a contact area with a wiper blade component, is undetachably connected to the wiper blade component and is provided to furnish a coupling area of the wiper blade component for coupling and/or contacting to a wiper arm adapter. A "vertical axis" refers in this context particularly to an axis which is disposed perpendicularly to a support surface of the wiper blade adapter. A "support surface" refers in this context particularly to a planar surface on which the wiper arm adapter is placed in an assembly process and/or which is provided to transmit a main contact pressing force of the wiper arm adapter onto the wiper blade adapter. A "main contact pressing force" refers in this context particularly to a force which presses the wiper blade adapter and/or a wiper blade in the direction of a surface to be wiped, such as in particular a vehicle window pane. The term "provided" refers to being specially designed and/or equipped.

In a further embodiment of the invention, it is proposed that the wiper blade adapter device comprises a detent unit which is provided to form a latching connection between the wiper arm adapter and the wiper blade adapter in an assembled state, whereby a particularly simple securing of the wiper blade adapter device can be achieved in an assembled state. By the term "detent unit", a mechanism is to be particularly understood which comprises at least one detent element that is elastically deflected in an assembly process in order to subsequently engage into a corresponding detent recess by means of an internal clamping force.

It is further proposed that the detent unit comprises at least one detent recess and at least one detent means, wherein the at least one detent means, in an assembled state, is disposed in a positive locking manner within the at least one detent recess. In so doing, a particularly reliable latching connection can be produced. "Detent means" refers in this context particularly to a resilient means for producing a latching connection, which means is intended to resiliently deflect during an assembly process. By the term "detent recess", a recess is particularly to be understood in this context which corresponds to a detent means and/or which is provided to receive the detent means in an assembled state.

If the at least one detent means is disposed on the wiper arm adapter, it can be designed to be very accessible to a user and a manipulation of the at least one detent means, for example during disassembly, can take place very easily.

In addition, it is proposed that the at least one detent means is intended to be deflected about the vertical axis. As a result, the amount of stress placed on the at least one detent means can be held to a minimum in an operating state, which can lead to a high durability of the wiper blade adapter device.

If the detent recess is disposed on the wiper blade adapter, the detent unit can be configured in a particularly space-saving manner. The detent recess is preferably disposed within a guide element of the wiper blade adapter.

It is proposed in a further embodiment of the invention that the pivot bearing unit comprises a bearing pin, which, in an assembled state, is provided to form a positive locking with a bearing recess. As a result, a space-saving and stable pivot bearing mounting of the wiper arm adapter and the wiper blade adapter can be achieved. A "bearing pin" refers in this context particularly to a cylindrical component which provides a bearing surface for coupling and/or contacting a component to be mounted.

A particularly stable embodiment of the pivot bearing unit can be achieved if the bearing pin is disposed on the wiper blade adapter. In an additional embodiment, the bearing pin is formed in one piece with a base body of the wiper blade adapter. The term "formed in one piece" refers to being materially bonded, such as, for example, by means of a welding process and/or an adhesive bonding process etc., and in a particularly advantageous manner to being integrally formed with said base body, such as being cast in one piece with said base body and/or being produced in a single- or multi-component injection molding process.

If the bearing recess is disposed on the wiper arm adapter, a reliable accommodation of the bearing pin and/or a reliable pivot bearing mounting of the wiper blade and the wiper arm adapter can be achieved.

BRIEF DESCRIPTION OF THE DRAWINGS

Further advantages ensue from the following description of the drawings. In the drawings, an exemplary embodiment of the invention is depicted. The drawings, the description and the claims contain numerous features in combination. The person skilled in the art will expediently consider the features individually and put them together to form further useful combinations.

In the drawings.

DETAILED DESCRIPTION

Figure 1:
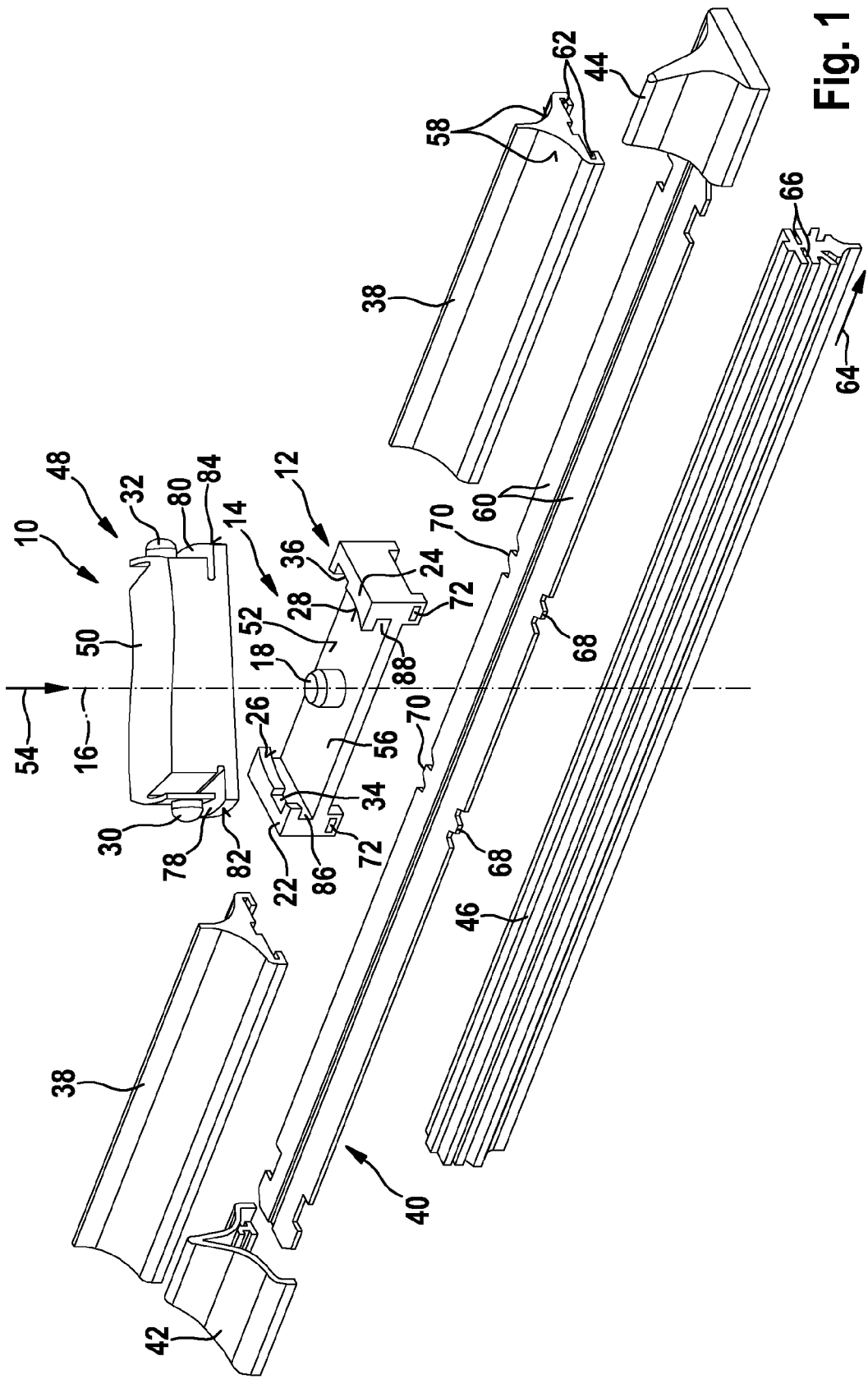
FIG. 1 shows an exploded view of a wiper blade adapter device according to the invention.

FIG. 1 shows an exploded view of an inventive wiper blade adapter device comprising a wiper arm adapter 10 and a wiper blade adapter 12. The wiper arm adapter 10 can be detached from the wiper blade adapter 12 and therefore is designed to be replaceable. The wiper arm adapter 10 has an interface with a wiper arm (not shown). Depending on the embodiment of the wiper arm, the wiper arm adapter 10 has to be replaced. Embodiments of said interface of the wiper arm adapter 10 are generally known by the person skilled in the art and are not depicted for reasons of clarity. The wiper blade adapter device further comprises a detent unit 48. The wiper arm adapter 10 has a base body 50, which includes in each case one detent means 30, 32 of the detent unit 48 on two opposite sides. The detent means 30, 32 are formed in one piece with the base body 32. The detent means 30, 32 can be deflected about a vertical axis 16 by maximally five millimeters.

The wiper blade adapter 12 comprises a base body 56. The base body 56 comprises a planar support surface 52. In addition, the base body 56 is formed from a plastic injection molded part. It is also conceivable in this context to form the base body 56 from a metal part, such as in particular from sheet metal.

The vertical axis 16 is disposed perpendicularly to the support surface 52 of the wiper blade adapter 12. The support surface 52 serves as an abutment face for the wiper arm adapter 10 during an assembly process. The wiper arm adapter 10 is placed on the support surface 52 during an assembly process. In addition, the vertical axis 16 is disposed parallel to a main contact pressing force 54 of the wiper arm adapter 10. The main contact pressing force 54 is generated by a torque of the wiper arm and presses the wiper blade adapter 12 and a wiper blade 46, which is connected to the wiper blade adapter 12 and is jointless, in the direction of a vehicle window pane to be wiped (not depicted).

A wind deflector element 38, a support element 40 and the wiper blade 46 are disposed on the wiper blade adapter device. The wind deflector element 38 comprises two symmetrically configured, concave wind deflector surfaces 58, which deflect an airstream occurring in an operating state and thereby increase the main contact pressing force 54. In addition, the wind deflector element 38 is two-parted, i.e. formed by two separate components.

The support element 40 comprises two spring rails 60. It is however also conceivable in this context to employ a one-piece spring rail as support element. The support element 40 is inserted into a longitudinal guide rail 62 of the wind deflector element 38 during assembly. The wiper blade 46 is then held on both sides by the spring rails 60. To this end, the wiper blade 46 has a receiving groove 66 for the support element 40 on each side. Two end caps 42, 44 lock the support element 40 in each case at one end in a longitudinal direction 64 of the wiper blade 46 and prevent the spring rails 60 from coming out of the receiving groove 66. In an assembled state, the wiper blade 46 is thus connected via the support element 40 to the wind deflector element 38 (FIG. 2).

The support element 40 has four mounting lugs 68, 70. In each case, two mounting lugs 68 point in a direction which runs opposite to a direction of the other two mounting lugs 70. The base body 56 of the wiper blade adapter 12 comprises four mounting recesses 72 which correspond to the mounting lugs 68, 70 in the form thereof. When mounting the wiper blade adapter 12 to the support element 40, the mounting lugs 68, 70 are inserted into the mounting recesses 72. Many additional attachment methods for attaching the support element 40 to the wiper blade adapter 12, which would appear useful to the person skilled in the art, are furthermore conceivable, such as in particular inserting a support element into a guide rail of the wiper blade adapter. It is furthermore conceivable for a support element to enclose the base body. In addition, it is also conceivable to adhesively bond, screw and/or rivet the support element to the base body. If the base body of the wiper blade adapter is formed by a metal part, the support body can be connected to said base body by means of a welded or soldered connection.

Figure 2:
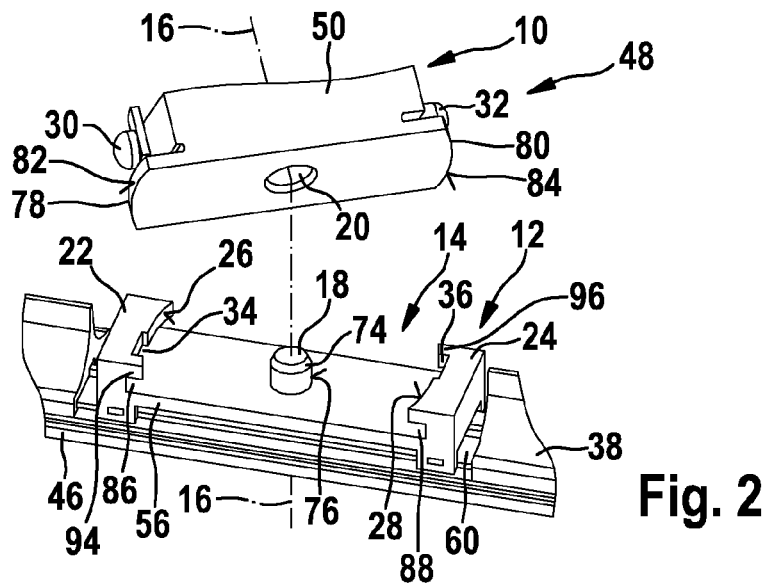
FIG. 2 shows a perspective view of the wiper blade adapter device according to FIG. 1 in a first assembly step.

FIG. 2 shows a perspective view of the wiper blade adapter device prior to assembly. The wind deflector element 38, the support element 40 and the wiper blade 46 are undetachably connected to the wiper blade adapter 12. The wiper blade adapter device comprises a pivot bearing unit 14. The pivot bearing unit 14 is provided to rotatably mount the wiper arm adapter 10 and the wiper blade adapter 12 in an assembly process relative to each other around the vertical axis 16. To this end, the pivot bearing unit 14 comprises a bearing pin 18.

The bearing pin 18 is formed integrally with the base body 56 of the wiper blade adapter 12. It is however also conceivable in this context for the bearing pin 18 to be attached to the base body 56 in a positive-locking and/or force fitting manner, such as in particular by means of a threaded connection. The bearing pin 18 has a cylindrical shape and has a chamfer 74 on a cylinder edge. A lateral surface 76 of the bearing pin 18 provides a bearing surface for contacting the wiper arm adapter 10. A bearing recess 20 is disposed in the base body 50 of the wiper arm adapter 10. The bearing recess 20 corresponds to the bearing pin 18 in the geometric form thereof. When inserting the bearing pin 18 into the bearing recess 20, the lateral surface 76 contacts the base body 50 within the bearing recess 20.

In addition to the two detent means 30, 32, the detent unit 48 comprises two detent recesses 34, 36 which are each disposed in a guide element 22, 24 of the base body 56 of the wiper blade adapter 12. The guide elements 22, 24 are formed integrally with the base body 56. The guide elements 22, 24 extend, starting at the support surface 52 of the base body 56, parallel to the vertical axis 16 in the same direction as the bearing pin 18. In so doing, each guide element 22, 24 forms a circular arc-shaped guide surface 26, 28 for guiding the wiper arm adapter 10 during an assembly process. A stop element 94, 96 is disposed at a free end of each guide element 22, 24. The stop elements 94, 96 are in each case integrally formed with the guide elements 22, 24. The stop elements 94, 96 are disposed opposite to one another on the base body 56 of the wiper blade adapter 12.

Figure 3:
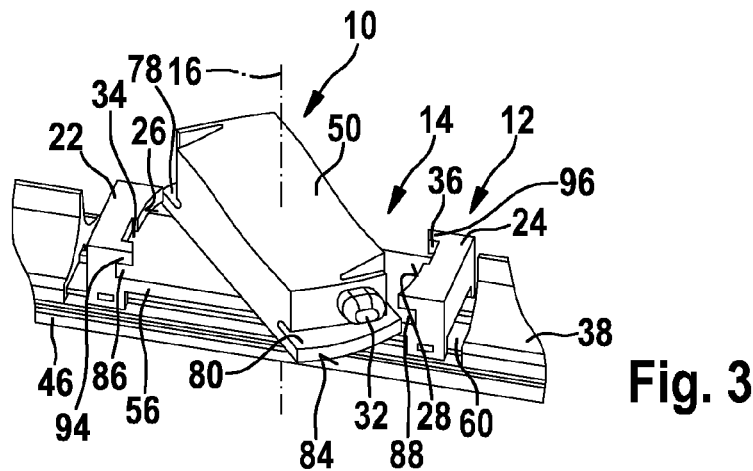
FIG. 3 shows a perspective view of the wiper blade adapter device according to FIG. 1 in a further assembly step.

In FIG. 3, the wiper blade adapter device is shown in a first assembly step. The wiper arm adapter 10 is thereby placed on the wiper blade adapter 12. The base body 50 of the wiper arm adapter 10 lies on the support surface 52 of the base body 56 of the wiper blade adapter 12. The bearing pin 18 of the wiper blade adapter 12 is disposed within the bearing recess 20 of the wiper arm adapter 10. A movement of the wiper blade adapter 12 relative to the wiper arm adapter 10 is possible in a translatory manner parallel to the vertical axis 16 and rotationally about the vertical axis 16.

In order to prevent a movement of the wiper blade adapter 12 relative to the wiper arm adapter 10 parallel to the vertical axis 16, the wiper arm adapter 10 has two vertical retaining means 78, 80 disposed opposite to one another on the base body 50. The vertical retaining means 78, 80 are integrally formed on the base body 50 as projections. Each of the vertical retaining means 78, 80 has an outer surface 82, 84 which is curved in an arched manner. The vertical retaining means 78, 80 form a counterpart to the guide elements 22, 24 as well as to the mounting grooves 86, 88 embedded in the guide elements 22, 24. When the wiper arm adapter 10 is rotated relative to the wiper blade adapter 12 about the vertical axis 16, the vertical retaining means 78, 80 engage in the mounting grooves 86, 88 in a positive-locking manner. The guide elements 22, 24 thus prevent a movement of the wiper arm adapter 10 relative to the wiper blade adapter 12 parallel to the vertical axis 16. The detent means 30, 32 are elastically deflected by the guide elements 22, 24 during the assembly process. In so doing, the detent means 30, 32 are moved in an end region in the direction of the bearing recess 20. The base body 50 of the wiper arm adapter 10 ultimately comes to rest against the stop elements 94, 96. The stop elements 94, 96 prevent the wiper arm adapter 10 from over-rotating relative to the wiper blade adapter 12. In addition, the stop elements 94, 96 at least partially absorb torques about the vertical axis 16 which occur in an operating state.

Figure 4:
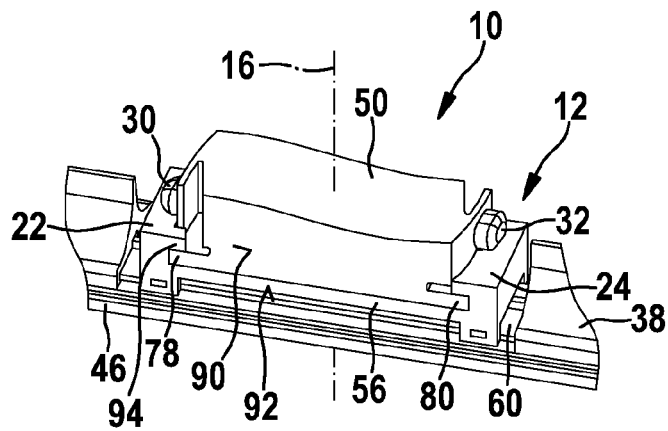
FIG. 4 shows a perspective view of the wiper blade adapter device according to FIG. 1 in an assembled state.

FIG. 4 shows the wiper blade adapter device in an assembled state. The detent means 30, 32 are disposed in a positive-locking manner within the detent recesses 34, 36. The detent unit 48 forms a latching connection between the wiper arm adapter 10 and the wiper blade adapter 12. A twisting of the wiper arm adapter 10 relative to the wiper blade adapter 12 is thereby prevented. An outer surface 90 of the base body 50 of the wiper arm adapter 10 lies flush against an outer surface 92 of the base body 56 of the wiper blade adapter 12. In the assembled state, the bearing pin 18 transmits forces which occur during operation and run perpendicularly to the vertical axis 16 directly to the wiper arm adapter 10. Operating forces which occur parallel to the vertical axis 16 are transmitted by the vertical retaining means 78, 80 and the guide elements 22, 24.

It is possible to release the latching connection by a deflection of the detent means 30, 32. In so doing, the detent means 30, 32 are moved against the inner resilience thereof out of the corresponding detent recesses 34, 36. The wiper arm adapter 10 is subsequently rotated relative to the wiper blade adapter 12. As a result, the vertical retaining means 78, 80 are released from the mounting grooves 86, 88, and the wiper arm adapter 10 can be removed from the bearing pin 18.

What is claimed is:

1. A wiper blade adapter device having a wiper arm adapter (10) and a wiper blade adapter (12), characterized by a pivot bearing unit (14) that rotatably mounts the wiper arm adapter (10) and the wiper blade adapter (12) in an assembly process relative to each other around a vertical axis (16), wherein the wiper arm adapter is configured to be coupled to a wiper arm, wherein the wiper blade adapter (12) includes a lower surface that is configured to be directly coupled to a wiper blade (46), wherein the pivot bearing unit (14) includes a bearing pin (18) disposed above the lower surface on the wiper blade adapter (12), wherein the bearing pin (18) extends from the wiper blade adapter (12) along the vertical axis (16) and in a direction away from the lower surface of the wiper blade adapter (12), and wherein the wiper arm adapter (10) is configured to be moved vertically down onto the bearing pin (18) along the vertical axis (16) and to rotate about the bearing pin (18) relative to the wiper blade adapter (12) during the assembly process, the wiper blade adapter device further comprising a detent unit (48) which is provided to form a latching connection between the wiper arm adapter (10) and the wiper blade adapter (12) in an assembled state, wherein the assembled state is a state in which the wiper arm adapter (10) has been rotated relative to the wiper blade adapter (12) about the vertical axis (16) until the latching connection occurs, wherein the detent unit (48) comprises at least one detent recess (34, 36) and at least one locking means (30, 32), wherein the at least one locking means (30, 32) is disposed in the assembled state in a positive-locking manner within the at least one detent recess (34, 36) to form the latching connection and to prevent rotation of the wiper arm adapter (10) about the vertical axis (16) and out of the assembled state, and wherein the at least one locking means (30, 32) includes an elastically deflectable tab that pivots about an axis parallel to the vertical axis (16).

2. The wiper blade adapter device according to claim 1, characterized in that the at least one locking means (30, 32) is disposed on the wiper arm adapter (10).

3. The wiper blade adapter device at least according to claim 1, characterized in that the detent recess (34, 36) is disposed on the wiper blade adapter (12).

4. The wiper blade adapter device according to claim 1, characterized in that the bearing pin (18) forms a positive locking with a bearing recess (20).

5. The wiper blade adapter device at least according to claim 4, characterized in that the bearing recess (20) is disposed on the wiper arm adapter (10).

6. The wiper blade adapter device according to claim 1 and further comprising a support element, the support element including a generally planar spring rail defining a generally horizontal plane, wherein the vertical axis is generally perpendicular to the plane, and wherein the wiper blade is held on the spring rail.

7. The wiper blade adapter device according to claim 6 wherein the wiper blade adapter is mounted on the support element.

8. The wiper blade adapter device according to claim 1, wherein the wiper blade adapter (12) is coupled to a wiper blade (46).

9. The wiper blade adapter device according to claim 8, wherein the wiper blade adapter (12) is fixed to the wiper blade (46).

10. The wiper blade adapter device according to claim 1, wherein the wiper arm adapter (10) is configured to be moved vertically onto the bearing pin (18) along the vertical axis (16) and to then rotate about the bearing pin (18) relative to the wiper blade adapter (12) during the assembly process, without any translational movement of the wiper arm adapter (10) after the wiper arm adapter (10) has been moved onto the bearing pin (18).

11. A wiper blade adapter device having a wiper arm adapter (10) and a wiper blade adapter (12), characterized by a pivot bearing unit (14) that rotatably mounts the wiper arm adapter (10) and the wiper blade adapter (12) in an assembly process relative to each other around a vertical axis (16), wherein the wiper arm adapter is configured to be coupled to a wiper arm, wherein the wiper blade adapter (12) includes a lower surface that is configured to be directly coupled to a wiper blade (46), wherein the pivot bearing unit (14) includes a bearing pin (18) disposed above the lower surface on the wiper blade adapter (12), wherein the bearing pin (18) extends from the wiper blade adapter (12) along the vertical axis (16) and in a direction away from the lower surface of the wiper blade adapter (12), and wherein the wiper arm adapter (10) is configured to be moved vertically down onto the bearing pin (18) along the vertical axis (16) and to rotate about the bearing pin (18) relative to the wiper blade adapter (12) during the assembly process, the wiper blade adapter device further comprising a detent unit (48) which is provided to form a latching connection between the wiper arm adapter (10) and the wiper blade adapter (12) in an assembled state, wherein the assembled state is a state in which the wiper arm adapter (10) has been rotated relative to the wiper blade adapter (12) about the vertical axis (16) until the latching connection occurs, wherein the detent unit (48) comprises at least one detent recess (34, 36) and at least one locking means (30, 32), wherein the at least one locking means (30, 32) is disposed in the assembled state in a positive-locking manner within the at least one detent recess (34, 36) to form the latching connection and to prevent rotation of the wiper arm adapter (10) about the vertical axis (16) and out of the assembled state, wherein the at least one locking means (30, 32) includes two elastically deflectable tabs, one on each of an opposing end of the wiper arm adapter (10).

12. The wiper blade adapter device according to claim 11, wherein the the detent recess (34, 36) is disposed on the wiper blade adapter (12).

13. The wiper blade adapter device according to claim 11, wherein the bearing pin (18) forms a positive locking with a bearing recess (20).

14. The wiper blade adapter device at least according to claim 11, further comprising a support element, the support element including a generally planar spring rail defining a generally horizontal plane, wherein the vertical axis is generally perpendicular to the plane, and wherein the wiper blade is held on the spring rail.

15. A wiper blade adapter device having a wiper arm adapter (10) and a wiper blade adapter (12), characterized by a pivot bearing unit (14) that rotatably mounts the wiper arm adapter (10) and the wiper blade adapter (12) in an assembly process relative to each other around a vertical axis (16), wherein the wiper arm adapter is configured to be coupled to a wiper arm, wherein the wiper blade adapter (12) includes a lower surface that is configured to be directly coupled to a wiper blade (46), wherein the pivot bearing unit (14) includes a bearing pin (18) disposed above the lower surface on the wiper blade adapter (12), wherein the bearing pin (18) extends from the wiper blade adapter (12) along the vertical axis (16) and in a direction away from the lower surface of the wiper blade adapter (12), and wherein the wiper arm adapter (10) is configured to be moved vertically down onto the bearing pin (18) along the vertical axis (16) and to rotate about the bearing pin (18) relative to the wiper blade adapter (12) during the assembly process, wherein the wiper arm adapter (10) includes at least one vertical retaining means (78, 80) to prevent the wiper arm adapter (10) from moving vertically relative to the wiper blade adapter (12) along the vertical axis (16) in an assembled state, and wherein the wiper blade adapter (12) includes at least one mounting groove (86, 88) configured to receive the at least one vertical retaining means (78, 80).

16. The wiper blade adapter device according to claim 15, wherein the at least one vertical retaining means (78, 80) includes a projection that extends along a direction perpendicular to the vertical axis (16), the projection including an outer, arched surface.

17. The wiper blade adapter device according to claim 15, wherein the wiper arm adapter (10) includes two vertical retaining means (78, 80), one on each of an opposing end of the wiper arm adapter (10), and wherein the wiper blade adapter (12) includes two mounting grooves (86, 88), one on each of an opposing end of the wiper blade adapter (12).

18. The wiper blade adapter device according to claim 15, wherein the wiper blade adapter device further comprising a detent unit (48) which is provided to form a latching connection between the wiper arm adapter (10) and the wiper blade adapter (12) in an assembled state, wherein the assembled state is a state in which the wiper arm adapter (10) has been rotated relative to the wiper blade adapter (12) about the vertical axis (16) until the latching connection occurs, wherein the detent unit (48) comprises at least one detent recess (34, 36) and at least one locking means (30, 32), wherein the at least one locking means (30, 32) is disposed in the assembled state in a positive-locking manner within the at least one detent recess (34, 36) to form the latching connection and to prevent rotation of the wiper arm adapter (10) about the vertical axis (16) and out of the assembled state.

19. The wiper blade adapter device according to claim 18, wherein the at least one locking means (30, 32) includes two elastically deflectable tabs, one on each of an opposing end of the wiper arm adapter (10), wherein the wiper arm adapter (10) includes two vertical retaining means (78, 80), one on each of an opposing end of the wiper arm adapter (10), and wherein the wiper blade adapter (12) includes two mounting grooves (86, 88), one on each of an opposing end of the wiper blade adapter (12).

20. The wiper blade adapter device according to claim 18, wherein the at least one vertical retaining means (78, 80) includes a projection that extends along a direction perpendicular to the vertical axis (16), the projection including an outer, arched surface.

* * * * *